US008115466B2

United States Patent
Choi et al.

(10) Patent No.: US 8,115,466 B2
(45) Date of Patent: Feb. 14, 2012

(54) CONVERTER AND DRIVING METHOD THEREOF

(75) Inventors: Hang-Seok Choi, Kunpo (KR); Young-Bae Park, Anyang (KR); Jae-Hwoan Chi, Seoul (KR); Gwan-Bon Koo, Bucheon (KR)

(73) Assignee: Fairchild Korea Semiconductor, Ltd., Bucheon-City (KR)

( * ) Notice: Subject to any disclaimer, the term of this patent is extended or adjusted under 35 U.S.C. 154(b) by 669 days.

(21) Appl. No.: 12/220,769

(22) Filed: Jul. 25, 2008
(Under 37 CFR 1.47)

(65) Prior Publication Data
US 2009/0251926 A1 Oct. 8, 2009

(30) Foreign Application Priority Data

Jul. 27, 2007 (KR) .................. 10-2007-0075584

(51) Int. Cl.
*G05F 1/40* (2006.01)
*H02M 3/335* (2006.01)
(52) U.S. Cl. ..................... 323/285; 363/21.08
(58) Field of Classification Search .......... 323/282–290; 363/21.08, 21.16
See application file for complete search history.

(56) References Cited

U.S. PATENT DOCUMENTS

| 4,766,528 | A | | 8/1988 | Marinus |
| 4,937,728 | A | | 6/1990 | Leonardi |
| 5,455,757 | A | * | 10/1995 | Nguyen et al. ............. 363/21.16 |
| 5,994,885 | A | | 11/1999 | Wilcox et al. |
| 6,018,467 | A | | 1/2000 | Majid et al. |
| 7,102,340 | B1 | * | 9/2006 | Ferguson ...................... 323/284 |
| 2004/0042239 | A1 | * | 3/2004 | Kitano ............................ 363/49 |
| 2007/0152647 | A1 | * | 7/2007 | Liao .............................. 323/282 |

* cited by examiner

*Primary Examiner* — Jessica Han
(74) *Attorney, Agent, or Firm* — Sidley Austin LLP

(57) ABSTRACT

A converter is disclosed for using at least one switch to convert an input signal to a square wave signal, and using the square wave signal to generate an output voltage. The converter converts the square wave signal by a switching operation of a switch and generates the output voltage, and includes a switch controller for controlling the switching operation. The switch controller generates a first signal VCT having a first period that varies according to an output voltage, controls the switching operation of the switch by using the first signal, detects the output voltage, a first current Ids2 flowing through the switch, and a level of the first signal, and controls a burst mode according to the detection results.

19 Claims, 5 Drawing Sheets

CONVERTER AND DRIVING METHOD THEREOF

CROSS-REFERENCE TO RELATED APPLICATION

This application claims priority to and the benefit of Korean Patent Application No. 10-2007-0075584, filed in the Korean Intellectual Property Office on Jul. 27, 2007, the entire contents of which are incorporated herein by reference.

BACKGROUND

1. Field of the Invention

The present invention relates to a resonant converter that operates in a burst mode according to a load. When a load connected to an output terminal of the converter is low, the converter stops performing a switching operation for a time and restarts the operation after a delay. The above operations can be performed repeatedly.

2. Description of the Related Art

When a switching frequency of a converter exceeds a predetermined threshold value, the converter may switch to a burst mode operation. As a load connected to the converter decreases, the switching frequency may increase to maintain an output voltage. When the switching frequency increases, a switching loss may increase. The converter may switch to the burst mode operation to reduce the switching losses. The threshold value of the switching frequency can be varied according to an input voltage. However, additional circuit elements are required to vary the threshold value according to the input voltage.

Figure 1:
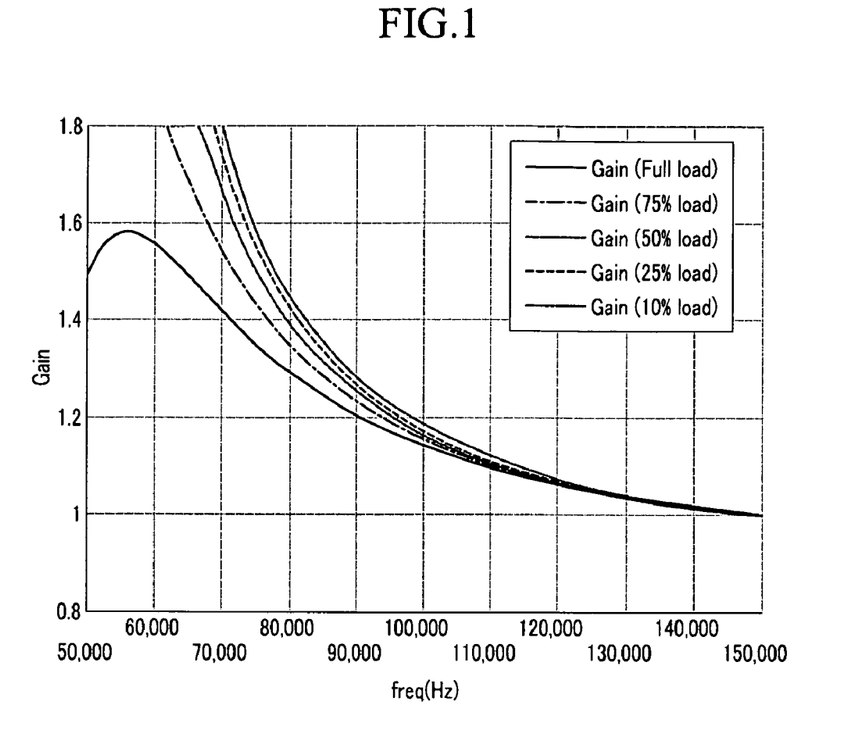
FIG. 1 is a diagram representing a relationship between a gain and a switching frequency according to a load.

FIG. 1 is a diagram representing a relationship between a gain and a switching frequency according to a load. The gain is a ratio of an input voltage and an output voltage of a converter.

When the load decreases, the switching frequency can increase to maintain the gain level. In addition, when an input voltage varies, the gain and the switching frequency can also vary. In detail, the converter can be driven to maintain the output voltage at a predetermined level regardless of the input voltage. This can be achieved by reducing the gain when the input voltage increases. In other cases the switching frequency can be increased when the gain decreases under the same load condition. In some cases, since the switching frequency varies according to a variation of the input voltage, the threshold switching frequency may need to be varied to control the onset of the burst mode.

Further, additional circuitry may be necessary to determine the switching frequency and to compare the switching frequency and the threshold value switching frequency while the converter is driven.

The above information disclosed in this Background section is only for enhancement of understanding of the background of the invention and therefore it may contain information that does not form prior art that is already known in this country to a person of ordinary skill in the art.

SUMMARY

Briefly and generally, embodiments of the present invention include a converter configured to control a burst mode of the converter without detecting a switching frequency, and a driving method thereof.

An embodiment of the converter may include a square wave generator, a voltage supply unit, and a switch controller. The square wave generator uses at least one switch and converts an input signal to a square wave signal. The voltage supply unit receives the square wave signal and generates an output voltage. The switch controller generates a first signal having a first period that varies according to the output voltage, controls a switching operation of the switch by using the first signal, detects the output voltage, a first current flowing through the switch, and a level of the first signal, and controls a burst mode according to the detection results. The switch controller compares a first time point where the first current is the same as a first reference value and a second time point where the first signal is the same as a first threshold value, and operates the converter in the burst mode when the second time point precedes the first time point. In this case, the first threshold value has a level that is lower than that of the first signal at the first time point where the first current is the same as the first reference value when a load connected to the voltage supply unit is in a light load state.

The switch controller detects the output voltage, and finishes the burst mode when the output voltage is decreased.

In addition, the switch controller may include a pulse width modulation (PWM) oscillator, a burst mode controller, and a PWM controller. The PWM oscillator generates a variable current corresponding to the output voltage, generates the first signal by using the variable current, and generates first and second oscillator signals having a period that is the same as that of the first signal. The burst mode controller receives the first signal, the second oscillator signal, a detection signal corresponding to the first current, and a second current corresponding to the variable current, and controls start and finish of the burst mode. The PWM controller controls the switching operation of the switch according to the first oscillator signal, and stops the switching operation of the switch during the burst mode. The PWM oscillator includes a capacitor, first and second dependent current sources for copying the variable current and respectively generating third and fourth currents, and the first switch for controlling charge and discharge of the capacitor. The capacitor is turned on by the third current when the switch is turned off, the capacitor is discharged by the fourth current when the switch is turned on, and the first signal corresponds to a voltage charged in the capacitor. The PWM oscillator further includes a first comparator, a second comparator, and an SR flipflop. The first comparator compares the first signal and a first reference voltage. The second comparator compares the first signal and a second reference voltage. The SR flipflop receives output signals of the first and second comparators, and converts levels of the first and second oscillator signals when the first signal is the same as the first reference voltage or the second reference voltage.

The burst mode controller includes a first comparator, a second comparator, a third comparator, and a logic operation unit. The first comparator compares the first signal and the first reference value. The second comparator compares the detection signal and the first threshold value. The third comparator compares a second signal for corresponding to the second current and a second reference value. The logic operation unit determines the start and finish of the burst mode according to output signals of the first to third comparators and the second oscillator signal. The logic operation unit generates a control signal for starting the burst mode when the first signal is higher than the first reference value, the second oscillator signal is a first level, and the detection signal is lower than the first threshold value, and generates a control signal for finishing the burst mode when the output signal of the third comparator is a second level. The logic operation unit includes an AND gate and an SR flipflop, the first and second levels are high levels, the AND gate receives the output signals of the first and second comparators and the second oscillator signal to perform a logic operation, a signal determined according to a logic operation result is input to a first terminal of the SR flipflop, and the output of the third comparator is input to a second terminal of the SR flip-flop.

The second current is generated by copying the variable current, and the second signal is generated when the second current flows to a resistor.

Further, the PWM controller may include a time delay unit and a logic operation unit. The time delay unit receives the first oscillator signal, delays the first oscillator signal for a predetermined time, and outputs the delayed first oscillator signal. The logic operation unit receives the output signal of the time delay unit, the first oscillator signal, and a control signal corresponding to the burst mode, and generates a signal for controlling the switching operation of the switch. The logic operation unit is synchronized with a first time point where the first signal reaches a minimum value to output the first oscillator signal of a first level, and generates, in a mode that is not the burst mode, a signal for turning on the switch at a time that is delayed from the first time point by the predetermined time.

The square wave generator may include first and second switches and alternately performs a switching operation for the first switch and the second switch, and the voltage supply unit includes a resonant network unit for resonating according to the square wave signal input from the square wave generator and a rectifier for rectifying an output signal of the resonant network unit and generating an output voltage. The converter according to an embodiment further includes a voltage detection diode and a feedback generator. The voltage detection diode detects the output voltage. The feedback generator includes a first transistor in which a current corresponds to light emission of the voltage detection diode. The switch controller generates the first signal by using a current that varies according to the current flowing through the first transistor.

A driving method of a converter may include converting an input signal into an output signal according to a switching operation of a switch, a first signal having a period that varies according to the output signal is generated, the switching operation of the switch is controlled by using the first signal, levels of the output signal, a second signal flowing through the switch, and the first signal are detected, and a burst mode is controlled according to the detection results. In the controlling of the burst mode, the second signal is detected, a first time point where the second signal is the same as a first reference value is detected, a second time point where the first signal is the same as a first threshold value is detected, the first and second time points are compared, and it is determined whether a burst mode is started. In the determining of whether the burst mode is started, the burst mode is started when the first time point precedes the second time point. The burst mode is finished when a signal corresponding to the output signal is decreased. The first threshold value has a level that is lower than that of the first signal at a first time point where the second signal is the same as the first reference value when the converter is in a light load state.

DETAILED DESCRIPTION

In the following detailed description, only certain embodiments have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element.

An embodiment of a converter will now be described with reference to the figures. Hereinafter, a "switching operation" will refer to an operation for turning on a switch, maintaining a turn-on state for a time, turning off the switch, and maintaining a turn-off state before turning on the switch again.

Figure 2:
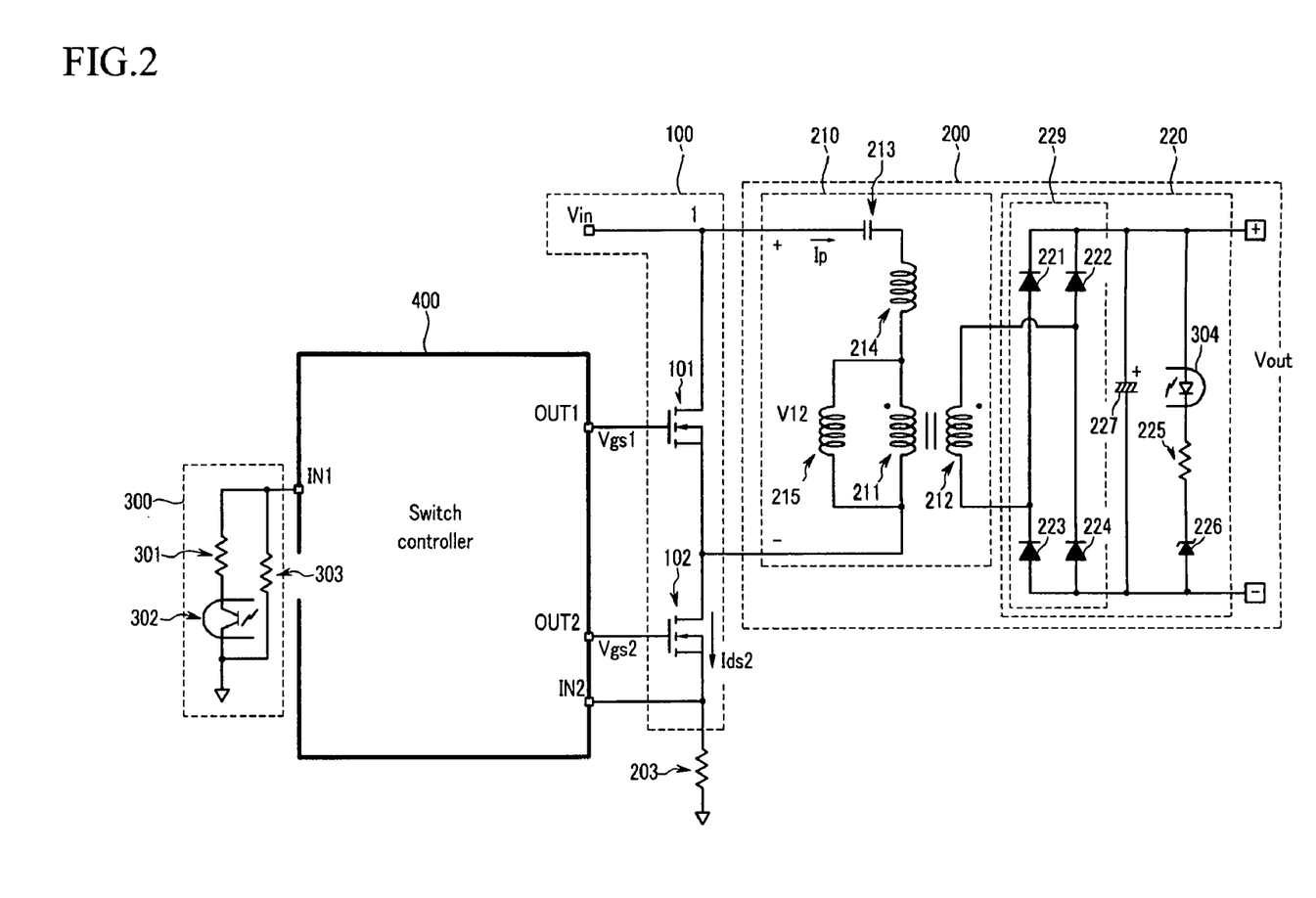
FIG. 2 is a configuration of a converter.

FIG. 2 is a configuration of a converter. The converter can includes a square wave generator 100, a voltage supply unit 200, a feedback information generator 300, and a switch controller 400.

The square wave generator 100 can include an upper switch 1001 and a lower switch 102. The square wave generator 100 may generate an input DC voltage Vin as a square wave by a switching operation of the upper switch 101 and the lower switch 102. The upper switch 1001 and the lower switch 102 can be alternately turned on/off with a duty cycle. The duty cycle can assume values in a broad range from low to high percentages. In some cases the duty cycle can be essentially 50%. Thereby, the voltage V12 between a node 1 and a node 2 becomes a square wave having a level that is equal to a voltage Vin as a peak value and a 0V voltage as a minimum value. The upper switch 101 can be controlled by a gate control signal Vgs1 transmitted from the switch controller 400 at a terminal OUT1, and the lower switch 102 can be controlled by a gate control signal Vgs2, transmitted from the switch controller 400 at a terminal OUT2. The upper switch 1001 and the lower switch 102 may be realized as n-channel metal oxide semiconductor field-effect transistors (MOSFET), as well as any other known switching devices, including p-channel MOSFETs, BJTs, JFETs and other variants.

The voltage supply unit 200 can include a resonant network unit 210 and a rectifier network unit 220. The resonant network unit 210 may include a primary coil 211, a secondary coil 212, and a capacitor 213. In FIG. 2, inductors 214 and 215 represent leakage inductance and magnetizing inductance of the transformer including the primary coil 211 and the secondary coil 212. The inductor 215 corresponds to the magnetizing inductance, and the inductor 214 corresponds to the leakage inductance.

The capacitor 213 can be charged to a predetermined voltage level by a current Ip generated by the voltage V12. The voltage charged in the capacitor 213 may be an offset voltage Voff, and a voltage generated in the primary coil 211 can have a waveform that is similar to a sinusoidal wave based on the offset voltage Voff. The voltage of the primary coil 211 can induce a voltage in the secondary coil according to a turn ratio of the primary coil 211 and secondary coil 212. The current Ip can be generated according to the voltage V12. The current Ip can induce a current Is in the secondary coil 212 according to the turn ratio of the primary coil 211 and the secondary coil 212. A waveform of the current Ip can be a sum of a current induced by the current Is in the primary coil 211 and a magnetizing current generated by the magnetizing inductance.

The rectifier network unit 220 may include a bridge rectifier circuit 229 and a capacitor 227. The bridge rectifier circuit 229 may include four diodes 221 to 224 and rectify the current Is to generate a current Id. The capacitor 227 can be charged by the current Id, generating an output voltage Vout.

Figure 3:
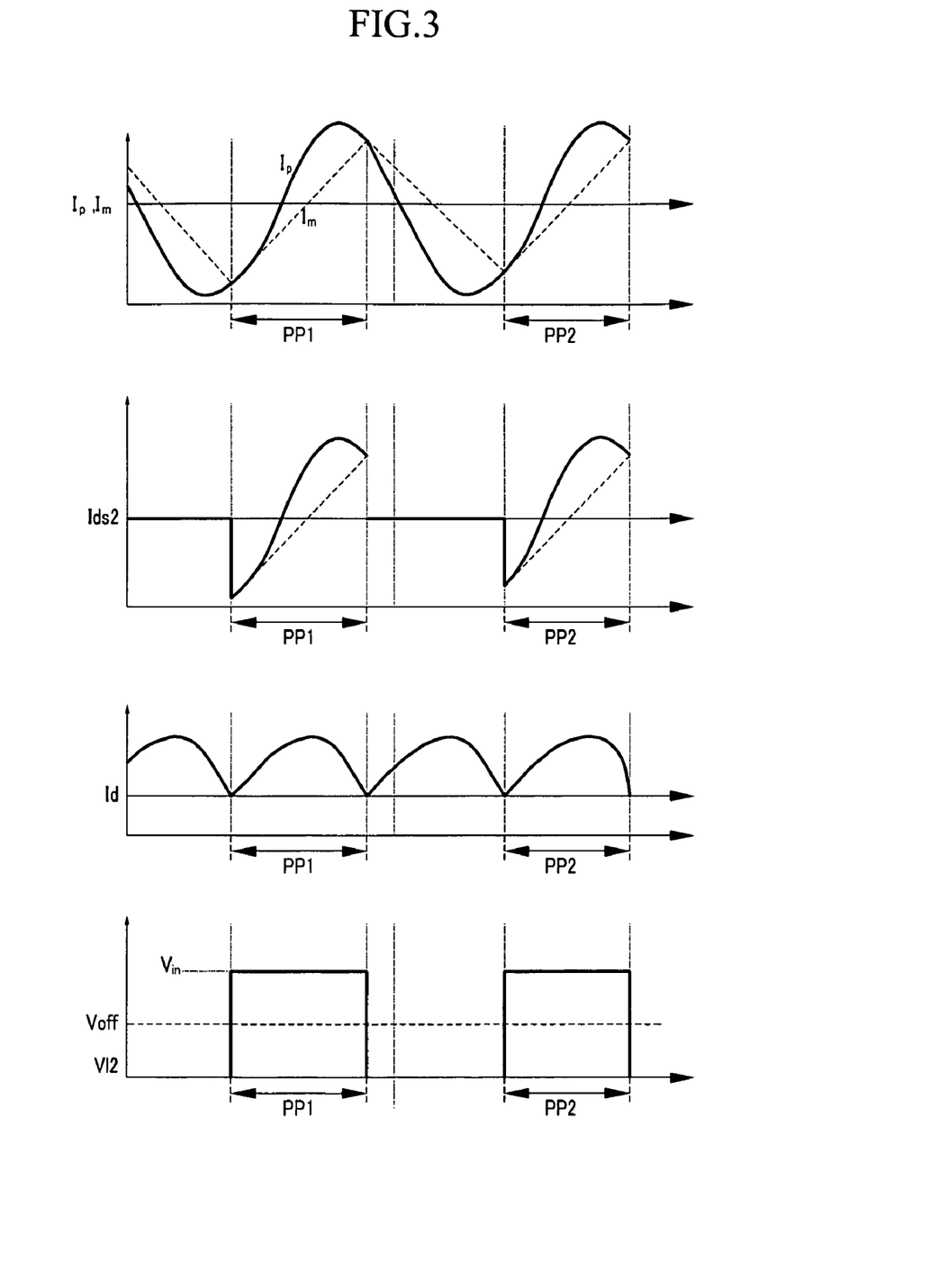
FIG. 3 is a diagram representing a current Ip, a current Id, a current flowing to a lower switch, and a voltage V12.

FIG. 3 is a diagram representing the primary coil current Ip, a magnetizing current Im, the current Id, a lower switch current Ids2 flowing to the lower switch 102, and the voltage V12.

In the period PP1 the lower switch 102 may be turned on. In this period the voltage V12 can become the same level as the input voltage Vin, and the current Ip can vary according to the voltage Vin. The current Im, shown as dotted lines, is a magnetizing current flowing through the magnetizing inductance. Im may increase and decrease approximately linearly. The current Ip may include a curved waveform generated by the linearly varying magnetizing current Im and the current Is that affects the primary coil 211. The current Ids2 flowing through the lower switch 102 can be the same in a period PP1 and a period PP2, and it can become essentially zero when the lower switch 102 is turned off. The current Id can have a rectified waveform. The converter may detect the current Ids2 to control the burst mode. When a load connected to the output terminal decreases, the curved line characteristic of the current Ip can decrease. The current Ip can be the same as the current Im in a no-load state. Since the current Ids2 is the same as the current Ip in the periods PP1 and PP2, the switch controller 400 can receive a signal VS1 generated by the current Ids2 flowing through a resistor 203 through an input terminal IN2, and detects a load state.

As shown in FIG. 3, a point where a current Ids2 waveform crosses a horizontal axis 0 varies according to the curved line of the current Ids2 waveform according to the current induced by the current Is. As the curved line decreases, the point crossing the horizontal axis 0 moves to the right. In the waveform of the current Ids2, the dotted lines indicate the magnetizing current. The current Ids2 assumes the waveform shown by the dotted lines when only the magnetizing current is left in the no-load state.

A zero crossing of the current Ids2 waveform can be generated later as the load decreases. The switch controller 400 can compare the signal VS1 waveform to a predetermined reference voltage while the lower switch 102 is turned on, and detect the load according to the comparison result. When the switch controller 400 determines that a load is close to no load (hereinafter referred to as a "light load"), the switch controller 400 may control the switching operations of the upper switch 101 and the lower switch 102 in the burst mode.

A configuration and an operation of the switching controller 400 will be described later with reference to FIG. 4. A Zener diode 226 of the rectifier network unit 220 can maintain voltages at a predetermined level such that the output voltage Vout does not vary according to the load or the input voltage Vin.

A voltage detection diode 304 can emit light in proportion to a voltage applied between terminals of the voltage detection diode 304. The output voltage Vout can be applied to the voltage detection diode 304, the Zener diode 226, and a resistor 225, which can be coupled in series. As the output voltage Vout increases, the voltage applied to the voltage detection diode 304 can increase and light emission increases.

The voltage detection diode 304 and a detection transistor 302 of the feedback information generator 300 form an optocoupler.

The feedback information generator 300 can generate information corresponding to the output voltage Vout and transmit it to the input terminal of the switch controller 400. When the output voltage Vout increases and the light emission of the voltage detection diode 304 increases, a current flowing through the detection transistor 302 can increase and a current IC flowing from the input terminal IN1 to the feedback information generator 300 increases. The switch controller 400 can use the current IC to control the switching operations of the upper switch 101 and the lower switch 102. The described feedback information generator 300 is only one embodiment. In other embodiments, other, analogous or equivalent information generators 300 can be used to generate a current signal and a voltage that varies according to the output voltage Vout.

Figure 4:
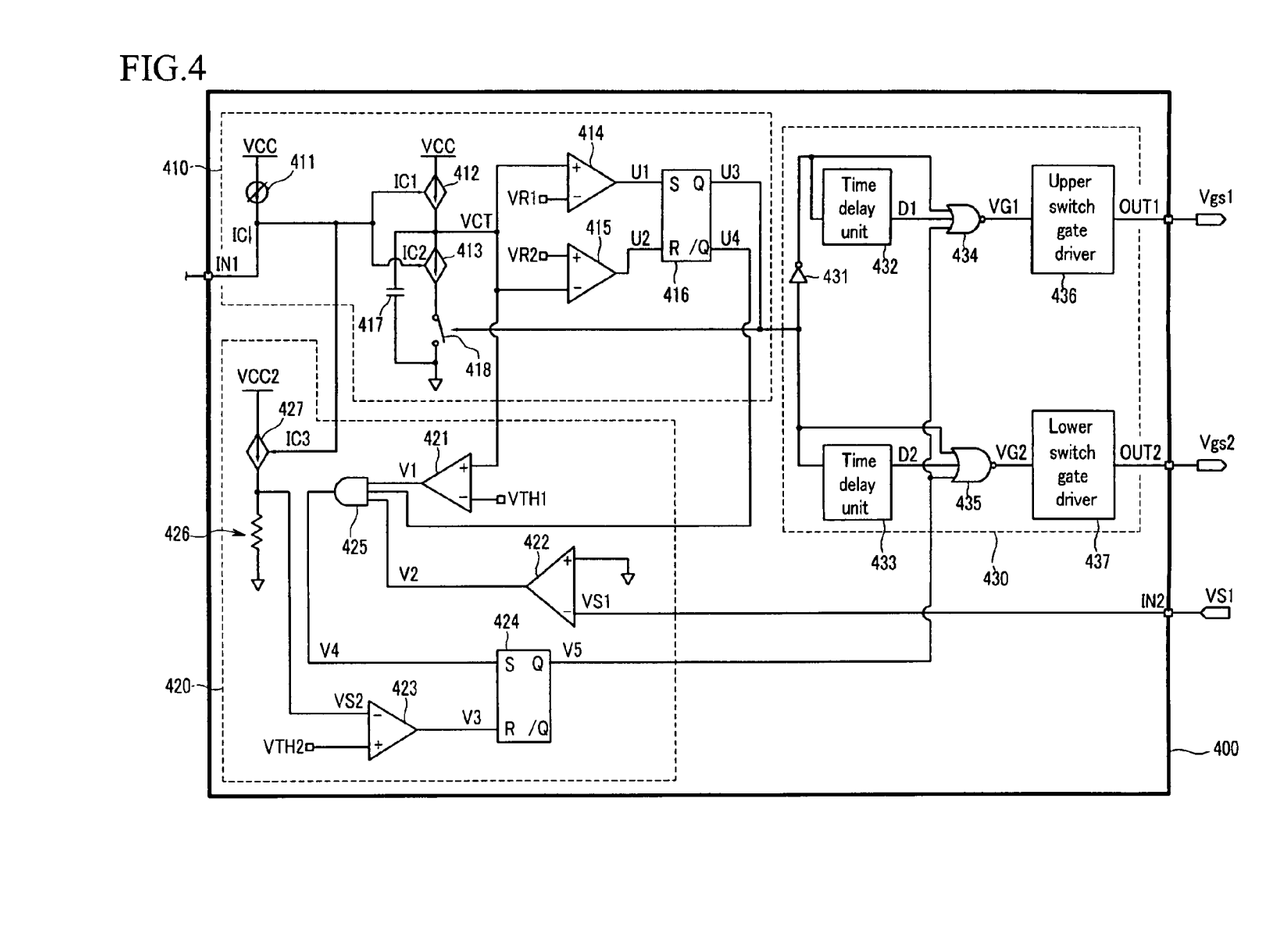
FIG. 4 is a diagram representing a switch controller.

FIG. 4 is a diagram representing the switch controller 400. The switch controller 400 can output the gate control signal Vgs1 through an output terminal OUT1 to the upper switch 101, and the gate control signal Vgs2 through an output terminal OUT2 to the lower switch 102. The switching controller 400 can receive the signal VS1 corresponding to the current Ids2 through the input terminal IN2, and feedback information through an input terminal IN1.

The switch controller 400 can also include a pulse width modulation (PWM) oscillator 410, a burst mode controller 420, and a PWM controller 430.

The PWM oscillator 410 may receive the feedback information from the feedback information generator 300 through the input terminal IN1, and generate a signal VCT with a period determined according to the feedback information. The PWM oscillator 410 can use the signal VCT to generate a first oscillator signal U3 and a second oscillator signal U4. The first oscillator signal U3 may control a switching operation of the upper switch 101 and the lower switch 102, and the second oscillator signal U4 and the signal VCT may control a burst mode.

In detail, the PWM oscillator 410 can include a variable current source 411, a first dependent current source 412, a second dependent current source 413, a first comparator 414, a second comparator 415, an SR flipflop 416, a capacitor 417, and a switch 418. The variable current source 411, the first dependent current source 412, the second dependent current source 413, the capacitor 417, and the switch 418 can generate the signal VCT having the period determined according to the feedback information. The first comparator 414, the second comparator 415, and the SR flip-flop 416 may use the signal VCT to generate the first and second oscillator signals U3 and U4.

The variable current source 411 may use a reference voltage source VCC to generate the current IC, which varies as a current flowing through the detection transistor 302 varies according to the output voltage Vout. The first dependent current source 412 can generate a first dependent current IC1 according to the current IC. The second dependent current source 413 may generate a second dependent current IC2 according to the current IC. The second dependent current IC2 can have a value that is higher than that of the first dependent current IC1. A terminal of the capacitor 417 is connected to a node where the first dependent current source 412 and the second dependent current source 413 are electrically coupled. The other terminal of the capacitor 417 is grounded. The switch 418 can be electrically coupled between the second dependent current source 413 and a ground terminal.

The switch 418 can operate according to the first oscillator signal U3. In detail, the switch 418 can be turned on when the first oscillator signal U3 is a high level, and turned off when the first oscillator signal U3 is a low level. The first dependent current IC1 can charge the capacitor 417 to increase a voltage of the signal VCT when the switch 418 is turned off, and the second dependent current IC2 can discharge the capacitor 417 to decrease the voltage of the signal VCT when the switch 418 is turned on. The first and second dependent current sources 412 and 413 can use a current mirror circuit to generate the first and second dependent currents IC1 and IC2 that vary according to the current IC.

The signal VCT can be input to a non-inversion terminal (+) of the first comparator 414 and an inversion terminal (−) of the second comparator 415. The first comparator 414 can compare a reference voltage VR1 and a voltage level of the signal VCT, output a signal U1 of a high level when the signal VCT is higher than the reference voltage VR1, and output the signal U1 of a low level when the signal VCT is lower than the reference voltage VR1. The second comparator 415 may compare a reference voltage VR2 and the voltage level of the signal VCT, output a signal U2 of a high level when the signal VCT is lower than the reference voltage VR2, and output the signal U2 of a low level when the signal VCT is higher than the reference voltage VR2. In this case, the reference voltage VR1 can have a voltage level that is higher than that of the reference voltage VR2.

The signal U1 and the signal U2 may be transmitted to a set terminal S and a reset terminal R of the SR flipflop 416. The SR flipflop 416 can generate the first oscillator signal U3 and the second oscillator signal U4 according to the levels of the signals U1 and U2. The operation and signals of the SR flipflop 416 will be described in three cases: when "SR=00", "SR=10", and "SR=01", indicating the levels of the signals input to the set terminal S and the reset terminal R. In the case "SR=00", the signal U1 and the signal U2 have low levels. In the case "SR=10", the signal U1 has a high level and the signal U2 has a low level. In the case "SR=01", the signal U1 has a low level and the signal U2 has a high level.

In some embodiments the SR flipflop 416 can maintain a current output state if the input is "SR=00". The SR flipflop 416 can output a high level signal through an output terminal Q and a low level signal through an inverted output terminal/Q if the input is "SR=10". The SR flipflop 416 can output a low level signal through the output terminal Q and a high level signal through the output terminal/Q if the input is "SR=01". When the voltage level of the signal VCT increases up to the reference voltage VR1, the signal U1 can become a high level and the signal U2 a low level. Accordingly, the first oscillator signal U3, output through the output terminal Q of the SR flipflop 416, can be a high level. At this time the switch 418 can be turned on and the capacitor 417 can discharge. Thereby, the voltage level of the signal VCT may decrease. When the voltage level of the signal VCT decreases below the reference voltage VR1, the signal U1 may be a low level and the signal U2 a low level, i.e. the input of the SR flipflop is an "SR=00" and therefore, the SR flipflop 416 can maintain its current output state.

When the signal VCT decreases to the reference voltage VR2, the signal U2 may switch to a high level while the signal U1 remains a low level. Thereby, the input of the SR flipflop 416 becomes an "SR=01" and thus the SR flipflop 416 may output the first oscillator signal U3 on a low level through the output terminal Q and the second oscillator signal U4 on a high level. The switch 418 may be turned off in response to the first oscillator signal U3 being low level. Therefore, the capacitor 417 can be charged by the current IC1 of the first dependent current source 412, thus increasing the voltage of the signal VCT.

When the voltage of the signal VCT increases above the reference voltage VR2, the signal U2 may switch to a low level. Thereby, the input of the SR flipflop 416 is an "SR=00" and thus the SR flipflop 416 can maintain the current output state until the signal VCT reaches the reference voltage VR1. The PWM oscillator 410 may repeatedly perform the above operation.

When the current IC varies according to the output voltage Vout, currents of the first dependent current source 412 and the second dependent current source 413 may vary. Thereby, an amount of current for charging or discharging the capacitor 417 varies, and increasing and decreasing slopes of the voltage of the signal VCT may vary. The voltage of the signal VCT increases from the reference voltage VR2 to the reference voltage VR1 and the voltage of the signal VCT decreases from the reference voltage VR1 to the reference voltage VR2 for a period of the signal VCT. Then, the period of the signal VCT varies according to the output voltage Vout. Thereby, periods of the first and second oscillator signals U3 and U4 vary.

In some embodiments, by using signals having periods that vary according to the output voltage Vout, the switching operations of the upper switch 101 and the lower switch 102 can be controlled and the burst mode of the converter can be controlled.

In detail, the PWM oscillator 410 can transmit the signal VCT and the second oscillator signal U4 to the burst mode controller 420, and the first oscillator signal U3 to the PWM controller 430. The PWM controller 430 can control the switching operation of the upper switch 101 and the lower switch 102 according to the first oscillator signal U3. Accordingly, the PWM controller 430 may control the switching operations of the upper switch 101 and the lower switch 102 according to the output voltage to perform PWM operation. In some embodiments the slope of charging and discharging of the capacitor 417 can vary by using the dependent current source to vary the period of the signal VCT. In other embodiments the period of the signal VCT may vary by varying the reference voltages VR1 and VR2.

A method and a configuration of the converter for controlling the burst mode in some embodiments will now be described.

The burst mode controller 420 can use a detection voltage VS1, the signal VCT, and the second oscillator signal U4 to control the start and the end of the burst mode. The burst mode controller 420 can include a third comparator 421, a fourth comparator 422, a fifth comparator 423, an SR flipflop 424, an AND gate 425, a resistor 426, and a third dependent current source 427. The AND gate 425 and the SR flip-flop 424 can receive output signals of the third to fifth comparators 421 to 423 and the second oscillator signal U4, and perform logic operations. According to a result of the logic operation, the SR flipflop 424 can output a control signal V5 to operate the converter in the burst mode or to end the burst mode through the output terminal Q.

The third to fifth comparators 421, 422, and 423 can output a signal of a low level when a level of a signal input to the non-inversion terminal (+) is lower than a voltage of an inversion terminal (−), and output a signal of a high level when the level of the signal input to the non-inversion terminal (+) is higher than the voltage of the inversion terminal (−). The signal VCT can be input to a non-inversion terminal (+) of the third comparator 421, and a threshold voltage VTH1 can be input to an inversion terminal (−) thereof. The third comparator 421 may compare the signal VCT and the threshold voltage VTH1, and output a signal V1 having different levels according to a comparison result. The threshold voltage VTH1 can determine a state of a load connected to the output terminal, and a level thereof is determined according to a circuit design. The threshold voltage VTH1 can be determined to be a level that is lower than the voltage of the signal VCT at a zero crossing point of the current Ids2 in a light load state (hereinafter referred to as a "light load threshold voltage"). The light load can be determined according to the circuit design. The threshold voltage VTH1 can be set to be lower than the light load threshold voltage. When the threshold voltage VTH1 is set to be the same as the light load threshold voltage, a light load state may not be detected. Thus, in some embodiments, the threshold voltage VTH1 can be set to be close to or lower than the light load threshold voltage.

A ground voltage can be input to a non-inversion terminal (+) of the fourth comparator 422 and a detection voltage VS1 to an inversion terminal (−) thereof. The fourth comparator 422 can compare the detection voltage VS1 and the ground voltage, and output a signal V2 having different levels according to the comparison result. The fourth comparator 423 may compare the ground voltage and the detection voltage VS1, and detect the zero crossing point of the current Ids2. The detection voltage VS1 can be generated while the current Ids2 flows through the resistor 203 and is determined according to the current Ids2. The detection voltage VS1 reaches the ground voltage essentially at the zero crossing of the current Ids2.

A threshold voltage VTH2 can be input to a non-inversion terminal (+) of the fifth comparator 423, and a signal VS2 to an inversion terminal (−) thereof. The threshold voltage VTH2 can be set to determine a finishing point of the burst mode operation. In detail, in a manner similar to that of the first and second dependent current sources 412 and 413, the third dependent current source 427 may copy the current IC of the variable current source 411 to generate a current IC3. When the output voltage decreases because the switching operation of the converter stops, the current IC can decrease, and therefore the current IC3 can decrease. Thereby, the voltage signal VS2, generated by the current IC3, decreases. When the voltage signal VS2 decreases below the threshold voltage VTH2, the fifth comparator 423 can output a signal V3 of a high level. When the signal V3 of the high level is input to a reset terminal R of the SR flipflop 424, a signal V5 output from the output terminal Q may become a low level. From a point where the signal V5 becomes low level, the PWM controller 430 can control the switching operation to start in response to the first oscillator signal U3.

The AND gate 425 can include three input terminals. The signal V1, the signal V2, and the second oscillator signal U4 can be input to the three input terminals. The AND gate 425 may generate and output a signal V4 of a high level when the three input signals are high levels. The converter can determine the burst mode when the current Ids2 comes to be a no-load state before the zero crossing after the lower switch is turned on. The burst mode controller 420 can use the AND gate 425 to determine the above condition, but it is not limited thereto.

The SR flipflop 424 can generate the control signal V5 to determine a burst mode start and a burst mode end according to the output signal of the AND gate 425 and the output signal V3 of the third comparator 423. The SR flipflop 424 of the burst mode controller 420 may perform a login operation in a like manner of the SR flip-flop 416 of the PWM oscillator 410.

The output voltage of the converter can increase as the load connected to the converter is low. In this case the current IC3 has a high level and comes to be close to the no-load state. Thereby, the voltage signal VS2, generated by the current IC3, can be greater than the threshold voltage VTH2. Thus, when the current IC3 comes to be the no-load state, the signal V3 of the high level can be input to a set terminal S of the SR flipflop 424, the signal V3 of the low level to the reset terminal R of the SR flipflop 424, and the SR flipflop 424 can generate the signal V5 of a high level.

The PWM controller 430 can stop the switching operations of the upper switch 101 and the lower switch 102 according to the control signal V5 of the high level. Since the detection voltage VS1 is higher than the ground voltage after the crossing point of the current Ids2, the output signal V4 of the AND gate 425 can be a low level. Since the signals input to the set terminal S and the reset terminal R of the SR flip-flop 424 are low levels, the output signal of the SR flipflop 424 can remain. The output voltage Vout may decrease when the switching operation stops, and the voltage signal VS2 decreases to be lower than the threshold voltage VTH2 when the current IC3 decreases as the output voltage decreases. Thereby, the fifth comparator 423 may generate the signal V3 of a high level. Since the signal V3 of the high level is input to the reset terminal R of the SR flipflop 424 and the signal V4 of the low level is input to the set terminal S, the control signal V5 of the low level is output through the output terminal Q.

The PWM controller 430 can include an inverter 431, two time delay units 432 and 433, two NOR gates 434 and 435, an upper switch gate driver 436, and a lower switch gate driver 437. The inverter 431 can invert the first oscillator signal U3 to transmit it to the time delay unit 432 and to the NOR gate 434. The time delay unit 432 can delay the inverted first oscillator signal for a predetermined time to transmit it to the NOR gate 434. The NOR gate 434 may receive the control signal V5, the inverted first oscillator signal, and the delayed inverted first oscillator signal, and perform a logic operation and generates a control signal VG1. The NOR gate 434 can output the control signal VG1 of a high level when the input signals are the low levels. The upper switch gate driver 436 may generate the gate control signal Vgs1 for controlling an on/off operation of the upper switch according to the control signal VG1, and output the gate control signal Vgs1 through the output terminal OUT1. The time delay unit 433 can delay the first oscillator signal U3 for a predetermined time, and transmit it to the NOR gate 435. The NOR gate 435 may receive the control signal V5, the first oscillator signal U3, and the delayed first oscillator signal, perform a logic operation and generate a control signal VG2. The NOR gate 435 can output the controls signal VG2 of a high level when the input signals are low levels. The lower switch gate driver 437 can generate the gate control signal Vgs2 for controlling an on/off operation of the lower switch according to the control signal VG2, and output the gate control signal Vgs2 through the output terminal OUT2.

An operation of the switching controller 400 will now be described with reference to FIG. 5.

Figure 5:
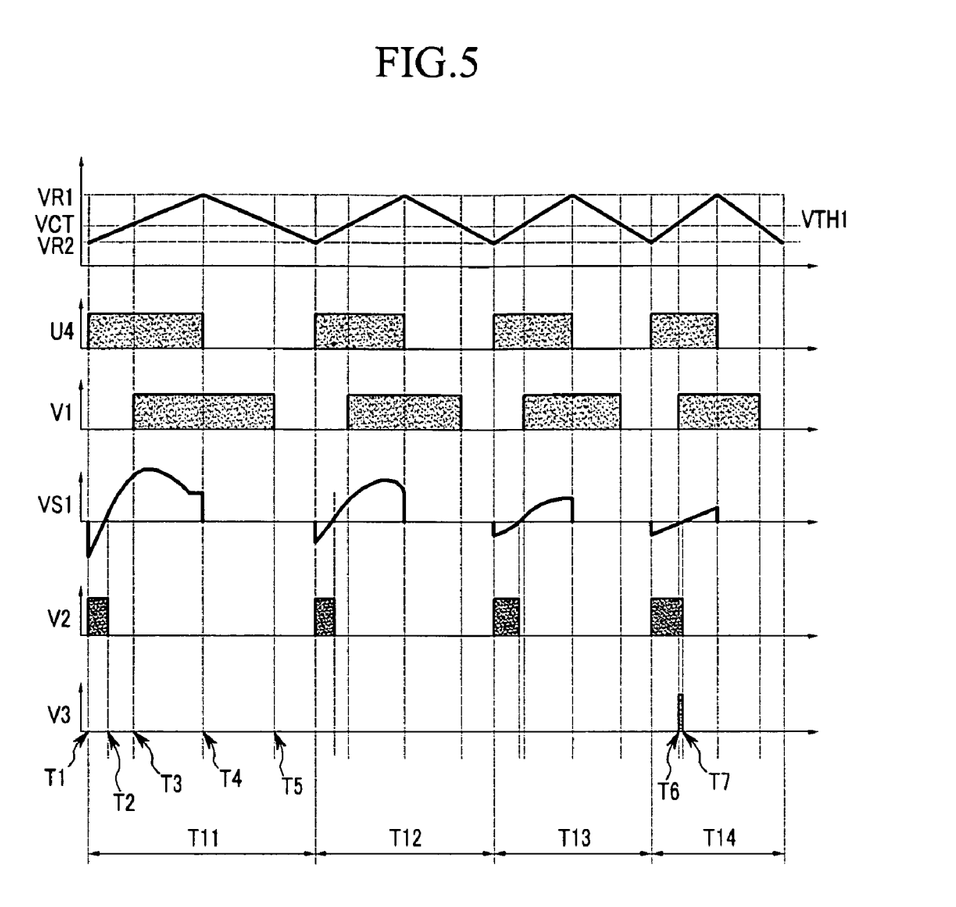
FIG. 5 is a waveform diagram representing a signal of the switch controller.

FIG. 5 is a waveform diagram representing the various signals of the switch controller 400. FIG. 5 illustrates the case when a load is gradually decreasing to describe an operation of the converter.

The signal VCT can have a waveform that cyclically increases and decreases between the reference voltage VR1 and the reference voltage VR2. Since the current IC can vary according to the output voltage Vout, the period of the signal VCT can also vary. When the signal VCT decreases to the reference voltage VR2, the second comparator 415 may output the signal U2 of a high level and the SR flipflop 416 can become synchronized with the signal U2 of a high level to output the second oscillator signal U4 of a high level.

At a time T1, the first oscillator signal U3 may become a low level and the signals input to the NOR gate 435 become a low level, turning on the lower switch. Thereby, the current Ids2 can flow to the lower switch 102 and generate the detection voltage VS1. Since the detection voltage VS1 can be a negative voltage between the times T1 and T2, the signal V2 has a high level. The time T2 may correspond to the zero crossing point of the current Ids2.

At a time T3, when the signal VCT increases to the no-load threshold voltage VTH1, the signal V1 can become a high level. After the time T2, since the signal VCT reaches the no-load threshold voltage, the signal V4 output from the AND gate 425 is maintained to be the low level. The SR flipflop 416 can maintain the second oscillator signal U4 in high level for T1-T4. The signal VCT can increase to the reference voltage VR1 at a time T4, the second oscillator signal U4 of a high level can become a low level, and the first oscillator signal U3 of a low level can become a high level. Thereby the lower switch 102 can be turned off and the detection voltage VS1 is not generated.

When the signal VCT decreases from the time T4, it may become equal to the no-load threshold voltage VTH1 at a time T5, at which moment the signal V1 can become a low level.

An interval T11 is a period of the signal VCT. The above described waveform can be repeated in subsequent periods. However, since the load decreases and the increasing and decreasing slopes of the signal VCT increase according to the increase of the output voltage Vout, the period can gradually decrease. During the intervals T12 and T13, signals can be generated in a similar manner as during the interval T11. However, as the load decreases, a curved line of the detection voltage VS1 decreases, e.g. in the form of its slope decreasing.

Since the load considerably decreases during the interval T14, a time T6 where the signal VCT reaches the no-load threshold voltage VTH1 may precede a time T7 that is a zero crossing of the detection voltage VS1. Between the time T6 and the time T7, since the signals V1, U4, and V2 input to the AND gate 425 are high levels, the signal V4 can become a high level. In synchronization with the signal V4 of a high level, the SR flipflop 424 outputs the control signal V5 of a high level. Thereby, the NOR gates 434 and 435 may output signals of a low level, and the upper switch 101 and the lower switch 102 do not perform the switching operation and remain turned off.

In some embodiments, by using the zero crossing point, the burst mode is controlled. Correspondingly, the start and end of the burst mode may be controlled by using the waveform of the current Ids2. Therefore, in embodiments, the converter is capable of controlling the burst mode without an additional device.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A converter that operates in burst mode according to a load, the converter comprising:
   a square wave generator with at least one switch, configured to convert an input signal to a square wave signal;
   a voltage supply unit configured to receive the square wave signal and to generate an output voltage to be provided to the load; and
   a switch controller configured to generate a first signal having a first period that varies according to the output voltage, to control a switching operation of the switch by using the first signal, to detect the output voltage, a first current flowing through the switch, and a level of the first signal, and to control a burst mode according to the detected voltage, wherein the switch controller comprises:
      a pulse width modulation (PWM) oscillator configured to generate a variable current corresponding to the output voltage, to generate the first signal by using the variable current, and to generate first and second oscillator signals having a period that is the same as that of the first signal;
      a burst mode controller configured to receive the first signal, the second oscillator signal, a detection signal corresponding to the first current, and a second current corresponding to the variable current, and to control start and finish of the burst mode; and
      a PWM controller configured to control the switching operation of the switch according to the first oscillator signal, and to stop the switching operation of the switch during the burst mode.

2. The converter of claim 1, wherein the switch controller is configured to compare a first time where the first current is the same as a first reference value and a second time where the first signal is the same as a first threshold value, and to operate the converter in the burst mode when the second time precedes the first time.

3. The converter of claim 2, wherein the first threshold value has a level that is lower than that of the first signal at the first time where the first current is the same as the first reference value when a load connected to the voltage supply unit is in a light load state.

4. The converter of claim 2, wherein the switch controller is configured to detect the output voltage, and to finish the burst mode when the output voltage decreases.

5. The converter of claim 1, wherein the PWM oscillator comprises:
   a capacitor;
   first and second dependent current sources configured to copy the variable current and respectively generating third and fourth currents; and
   the first switch configured to control charge and discharge of the capacitor,
   wherein the capacitor is turned on by the third current when the switch is turned off, the capacitor is discharged by the fourth current when the switch is turned on, and the first signal corresponds to a voltage charged in the capacitor.

6. The converter of claim 5, wherein the PWM oscillator further comprises:
   a first comparator configured to compare the first signal and a first reference voltage;
   a second comparator configured to compare the first signal and a second reference voltage; and
   an SR flipflop configured to receive output signals of the first and second comparators, and to convert levels of the first and second oscillator signals when the first signal is the same as the first reference voltage or the second reference voltage.

7. The converter of claim 1, wherein the burst mode controller comprises:

a first comparator configured to compare the first signal and the first reference value;

a second comparator configured to compare the detection signal and the first threshold value;

a third comparator configured to compare a second signal for corresponding to the second current and a second reference value; and a logic operation unit configured to determine the start and finish of the burst mode according to output signals of the first to third comparators and the second oscillator signal;

wherein the logic operation unit is configured to generate a control signal for starting the burst mode when the first signal is higher than the first reference value, the second oscillator signal is a first level, and the detection signal is lower than the first threshold value, and to generate a control signal to finish the burst mode when the output signal of the third comparator is a second level.

8. The converter of claim 7, wherein the logic operation unit comprises an AND gate and an SR flip-flop;

the first and second levels assume high levels;

the AND gate is configured to receive the output signals of the first and second comparators and the second oscillator signal to perform a logic operation; and the SR flipflop comprises a first input terminal configured to receive a signal related to the logic operation of the AND gate, and a second input terminal configured to receive an output of the third comparator.

9. The converter of claim 7, wherein the second current is generated by copying the variable current, and the second signal is generated when the second current flows to a resistor.

10. The converter of claim 1, wherein the PWM controller comprises:

a time delay unit configured to receive the first oscillator signal, to delay the first oscillator signal for a predetermined time, and to output the delayed first oscillator signal; and a logic operation unit configured to receive the output signal of the time delay unit, the first oscillator signal, and a control signal corresponding to the burst mode, and to generate a signal to control the switching operation of the switch.

11. The converter of claim 10, wherein the logic operation unit is synchronized with a first time where the first signal reaches a minimum value to output the first oscillator signal of a first level, and is configured to generate, in a mode that is not the burst mode, a signal for turning on the switch at a time that is delayed from the first time by the predetermined time.

12. The converter of claim 1, wherein the square wave generator is configured to alternately perform a switching operation for a first switch and a second switch; and the voltage supply unit comprises a resonant network unit configured to resonate according to the square wave signal input from the square wave generator and a rectifier configured to rectify an output signal of the resonant network unit and to generate an output voltage.

13. The converter of claim 12, further comprising:

a voltage detection diode configured to detect the output voltage; and a feedback generator including a first transistor in which a current corresponds to light emission of the voltage detection diode.

14. The converter of claim 13, wherein the switch controller is configure to generate the first signal by using a current that varies according to the current flowing through the first transistor.

15. A driving method of a converter including at least one switch and in which an input signal is converted to an output signal according to a switching operation of the switch, the driving method comprising:

generating a first signal having a period that varies according to the output signal;

controlling the switching operation of the switch by using the first signal; and detecting levels of the output signal, a second signal flowing through the switch, and the first signal, and controlling a burst mode according to the detected levels;

wherein controlling the switching operation comprises:

generating a variable current corresponding to the output signal;

generating the first signal by using the variable current;

generating first and second oscillator signals having a period that is the same as that of the first signal;

controlling start and finish of the burst mode in response to the first signal, the second oscillator signal, a detection signal corresponding to the first current, and a second current corresponding to the variable current;

controlling the switching operation of the switch according to the first oscillator signal; and stopping the switching operation of the switch during the burst mode.

16. The driving method of claim 15, wherein the controlling of the burst mode comprises:

detecting the second signal, and detecting a first time where the second signal is the same as a first reference value;

detecting a second time where the first signal is the same as a first threshold value; and comparing the first and the second time and determining whether a burst mode started.

17. The driving method of claim 16, wherein, the determining of whether the burst mode is started comprises:

starting the burst mode when the first time precedes the second time.

18. The driving method of claim 17, further comprising finishing the burst mode when a signal corresponding to the output signal is decreased.

19. The driving method of claim 16, wherein the first threshold value has a level that is lower than that of the first signal at a first time where the second signal is the same as the first reference value when the converter is in a light load state.

* * * * *